(12) United States Patent
Epitaux

(10) Patent No.: US 7,324,716 B2
(45) Date of Patent: Jan. 29, 2008

(54) SILICON PACKAGING FOR OPTO-ELECTRONIC MODULES

(75) Inventor: Marc Epitaux, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/026,259

(22) Filed: Dec. 30, 2004

(65) Prior Publication Data
US 2006/0147150 A1 Jul. 6, 2006

(51) Int. Cl.
G02B 6/12 (2006.01)
G02B 6/36 (2006.01)

(52) U.S. Cl. .......................................... 385/14; 385/92
(58) Field of Classification Search ................. 385/14, 385/88–94
See application file for complete search history.

(56) References Cited

U.S. PATENT DOCUMENTS

| 6,405,895 | B1 | 6/2002 | Kondo et al. |
| 6,450,702 | B1* | 9/2002 | Komoriya et al. ............. 385/90 |
| 6,495,895 | B1 | 12/2002 | Peterson et al. |
| 6,550,983 | B1* | 4/2003 | Gilliland et al. ............... 385/93 |
| 6,661,943 | B2* | 12/2003 | Li ................................. 385/18 |
| 6,735,008 | B2* | 5/2004 | Brophy et al. ............... 359/245 |
| 6,793,406 | B1* | 9/2004 | Edwards et al. ............... 385/88 |
| 6,860,652 | B2* | 3/2005 | Narayan et al. ............... 385/94 |
| 2002/0197025 | A1* | 12/2002 | Vaganov et al. .............. 385/92 |
| 2003/0036303 | A1 | 2/2003 | Fang et al. |
| 2004/0234214 | A1 | 11/2004 | Zheng |
| 2005/0201695 | A1* | 9/2005 | Farr ............................. 385/94 |

FOREIGN PATENT DOCUMENTS

| EP | 0 286 172 A1 | 10/1988 |
| WO | WO 2004/044420 A2 | 5/2004 |
| WO | WO 2004/107829 A2 | 12/2004 |
| WO | PCT/US2005/047380 | 7/2006 |

* cited by examiner

Primary Examiner—Tina M. Wong
(74) Attorney, Agent, or Firm—Blakely, Sokoloff, Taylor & Zafman LLP (57) ABSTRACT

An opto-electronic apparatus comprising a base layer, one or more photonic elements positioned on the base layer, and an optical layer suspended over the base layer, the optical layer including a moveable optical element positioned over at least one of the photonic elements. A process comprising forming a base layer, placing one or more photonic elements on the base layer, and suspending an optical layer over the photonic elements on the base layer, the optical layer including a moveable optical element.

28 Claims, 10 Drawing Sheets

SILICON PACKAGING FOR OPTO-ELECTRONIC MODULES

TECHNICAL FIELD

The present invention relates generally to opto-electronic devices and in particular, but not exclusively, to microelectromechanical (MEMS) packaging for opto-electronic modules.

BACKGROUND

The rapid scale-up of opto-electronic components, as well as the difficulties of manufacturing of opto-electronic components in high volumes, have been recognized as a key challenge in meeting the anticipated demand for high-bandwidth telecommunication equipment. Currently, active opto-electronic modules such as 10 Gb/s laser transmitters and receivers are produced in so-called "butterfly packages." Butterfly packages allow the incorporation of many features, but they are bulky and are also expensive to manufacture because their assembly is difficult to automate and many assembly functions must be performed by hand.

To reduce the cost and ease the automated assembly, the industry is today adopting a new packaging standard known as a TO (Transistor Outline) can package leveraged from existing technology from lower data rate (1-2 Gbs) equipment. While it offers some improvements over the butterfly package, when applied to high-bandwidth equipment this new TO can packaging is suffering from several performance and functional limitations like high optical coupling efficiency and low thermal cooling capability.

BRIEF DESCRIPTION OF THE DRAWINGS

Non-limiting and non-exhaustive descriptions of embodiments of the invention are presented with reference to the following figures, in which like reference numerals refer to like parts throughout the various views unless otherwise specified. Drawings are not to scale unless specifically noted.

DETAILED DESCRIPTION OF THE ILLUSTRATED EMBODIMENTS

Embodiments of an apparatus, process and system including microelectromechanical (MEMS) packaging of opto-electronic modules are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in the following description do not necessarily all refer to the same embodiment. Furthermore, the particular features, structures, or characteristics may be combined in any suitable manner in one or more embodiments.

Figure 1:
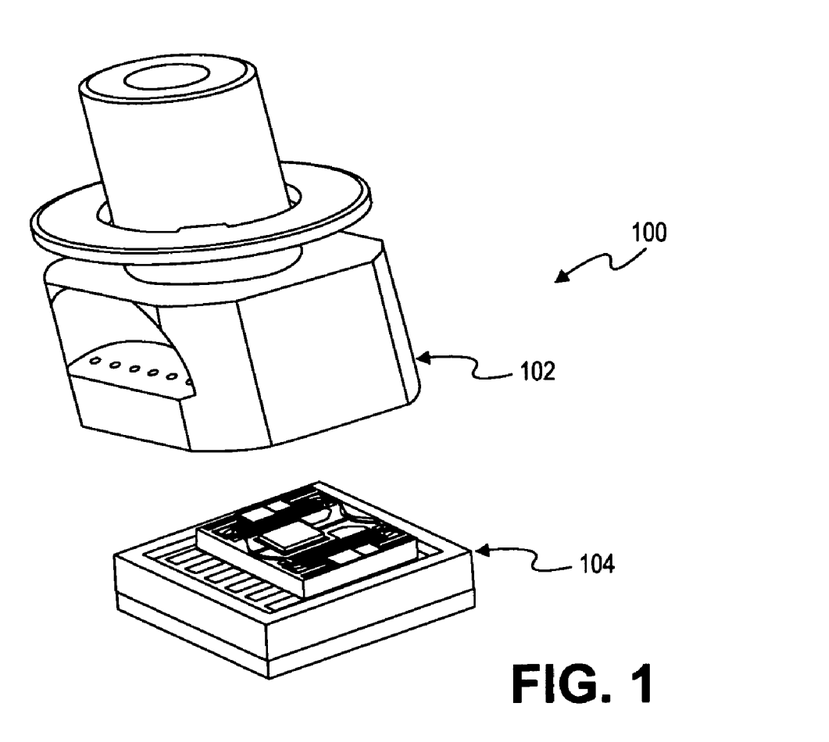
FIG. 1 is a perspective view of an embodiment of an assembly including an embodiment of an opto-electronic package of the present invention.

FIG. 1 illustrates an embodiment of an optical assembly 100. The optical assembly 100 includes an embodiment of a multi-layer opto-electronic package 104 that includes optical microelectromechanical (MEMS) components. To allow the opto-electronic package 104 to communicate with other optical components, the optical assembly 100 includes a receptacle 102 that can be attached to the opto-electronic package 104. The receptacle 102 provides a way to attach an optical fiber (not shown) to photonic components within the package 104 using an optical fiber connector that can be attached to the receptacle 102, thus putting the photonic components in optical communication with other devices. The opto-electronic package 104 can be either a transmitter or a receiver, and can therefore transmit signals to or receive signals from other optical components.

Figure 2:
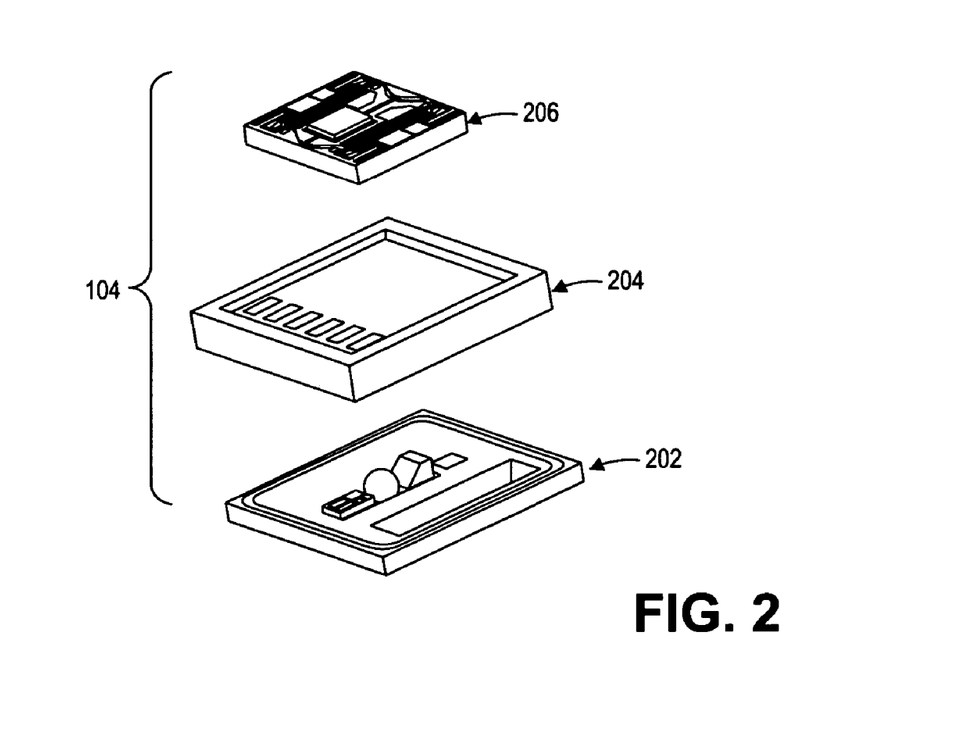
FIG. 2 is an exploded perspective view of the embodiment of the opto-electronic package shown in FIG. 1.

FIG. 2 illustrates an embodiment of the components of the opto-electronic package 104. The opto-electronic package 104 comprises a multi-layer stack including a base layer 202, a spacing layer 204 and an optical MEMS layer 206 comprising a MEMS microstage. The base layer 202 supports the entire package 104 and provides paths through which electrical signals and power can be delivered to photonic and other elements within the package. In addition, the base layer 202 provides a heat transfer path for heat generated within the package 104 to escape.

In the embodiment shown, the base layer 202 includes various photonic and electronic elements positioned or formed thereon. The base layer 202 supports the various photonic and electronic elements that are placed thereon and provides electrical connections to the photonic and electronic elements.

The spacing layer 204 is attached on top of the base layer 202. The spacing layer surrounds the photonic elements and provides hermeticity of the package. The spacing layer 204 also includes provisions such as electrical traces to provide signals and/or power to the optical MEMS layer 206. In addition, the spacing layer suspends the optical MEMS layer 206 above the photonic elements in the base layer and sets a specific and known distance between the photonic components on the base layer and the vertex of a moveable optical element, such as a lens found in the optical MEMS layer 206, and also can ensure an electrical connection between the inside and the outside of the package through the hermetic seal of the package.

The final element in the opto-electronic package 104 is an optical MEMS layer 206 formed over the spacing layer 204 and the base layer 202. In some embodiments the optical MEMS layer 206 can be placed within the hermetically sealed portion of the package 104, but in other embodiments the optical MEMS layer can be placed outside the hermetically sealed portion. Details of embodiments of the base layer 202, spacing layer 204 and optical MEMS layer 206 are discussed below in connection with FIGS. 3-7.

Figure 3:
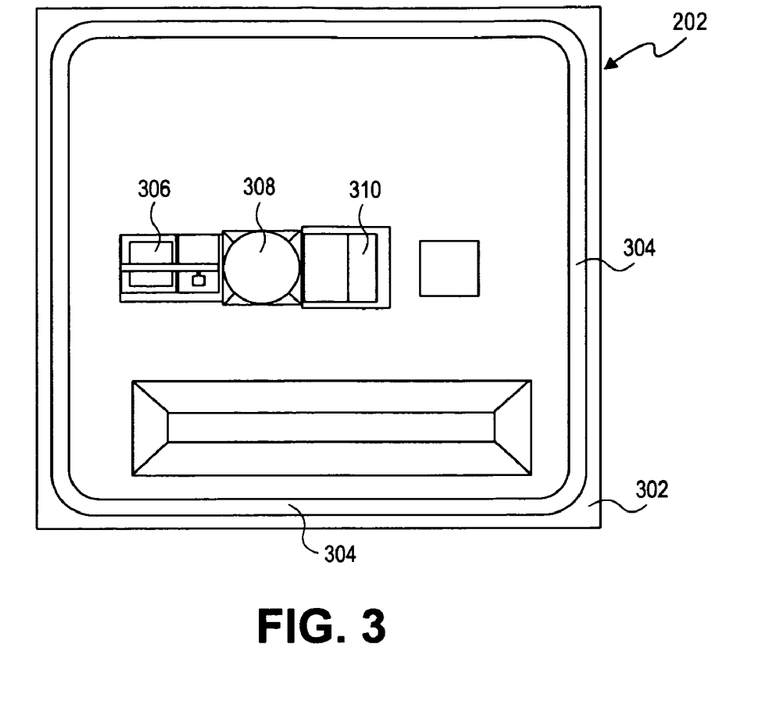
FIG. 3 is a plan view of an embodiment of a base layer.
Figure 4:
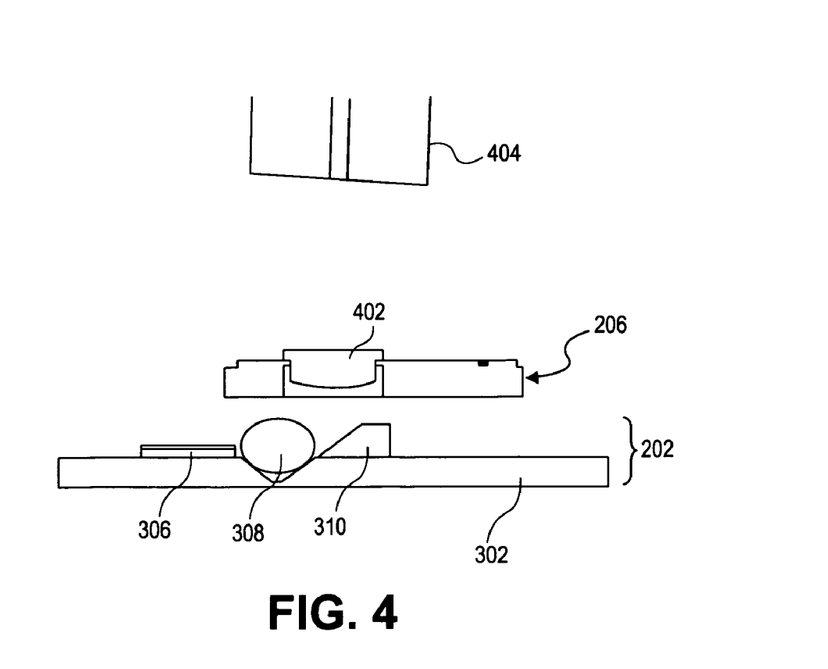
FIG. 4 is a cross-section of the embodiment of the base layer of FIG. 3 illustrating the base layer as well as the positioning of an optical MEMS layer and an optical fiber relative to the base layer.

FIGS. 3 and 4 illustrate the details of an embodiment of the base layer 202. The base layer 202 is generally rectangular and is formed on a substrate 302. In one embodiment the substrate 302 is made of silicon, although in other embodiments other materials or other combinations of materials can be used.

Various photonic and electronic components are placed on the substrate 302. In the embodiment shown, a edge emitting laser diode 306 is attached on the substrate 302 and various other active or passive optical elements, such as lens 308 and turning mirror 310, are attached on the substrate to condition and direct a laser beam emanating from the laser diode 304. One or more wire-bonding pads (not shown) provide attachment points for wires to provide electrical power, electrical signals, or both, as the case may be, to the electronic and photonic components on the base layer. The illustrated embodiment is only one possible combination of photonic elements that can be used; in other embodiments, more, less or different photonic elements. For example, in a different embodiment the edge-emitting laser can be replaced with a light emitting diode (LED). In other embodiments, the edge-emitting laser can be replaced with a vertical surface emitting laser (e.g., a VCSEL), in which case elements such as the turning mirror 310 can be omitted.

A seal ring 304 is formed at or near the perimeter of the substrate 302. The seal ring 304 surrounds the area 306 and most of the electrical traces 308. The purpose of the seal ring 304 is to allow for control of the spacing between the base layer 202 and the spacing layer 204, as well as to allow the base layer to form a hermetic seal with the spacing layer 204 when that layer is later placed on the base layer (see FIG. 7). In one embodiment, the seal ring 304 may be formed of gold, although in other embodiments the seal ring 304 can be formed of multiple different metal layer like Titanium (Ti), Nickel (Ni), Gold (Au), Platinum (Pt), or combinations or alloys of these metals. In further embodiments, different variations of silicon materials, materials other than silicon, or combinations of silicon and non-silicon materials can be used.

FIG. 4 further illustrates the construction of the embodiment of the base layer 202. In the embodiment shown, the laser diode 306 emits a laser beam in the direction of the optical element 308, which in this embodiment is a lens but in other embodiments can be a different optical element. The lens 308 collimates the beam exiting the laser and directs the collimated beam toward the turning mirror 310, which turns the collimated laser beam through about 90°, thus turning the laser beam out of the plane of the base layer 202. In other embodiments it is of course possible to use the turning mirror to turn the beam through an angle other than about 90°. When the optical layer 208 (described below in connection with FIGS. 5 and 6) is in place, the collimated beam is focused by the moveable optical element 402 such that it is launched into the end of an optical fiber 404. Since the moveable optical element 402 is moveable, it can me moved around to optimize the optical coupling between the laser diode 306 and the optical fiber 404 when the optical fiber is connected to the package 104 through the receptacle 102, as shown in FIG. 1. As described above, in other embodiments more, less or different photonic elements can be used. For example, in a different embodiment the edge-emitting laser can be replaced with a light emitting diode (LED) or the edge-emitting laser can be replaced with a vertical surface emitting laser (e.g., a VCSEL), in which case elements such as the turning mirror 310 can be omitted.

The operation of the base layer 202 described above is characteristic of a transmitter, but a receiver embodiment of the base layer can also be constructed. In a receiver embodiment, the laser diode 306 is replaced with a photodetector and the direction of the signal is reversed, such that a signal traveling through the fiber 404 is emitted from the fiber end and collimated by the moveable optical element 402. The collimated signal is then turned about 90°, directed toward turning mirror 310, and directed toward the optical element 308, which then focuses the incoming signal onto the photodetector. As with the transmitter embodiment described above, other embodiments of the receiver can include more, less or different components.

Figure 5:
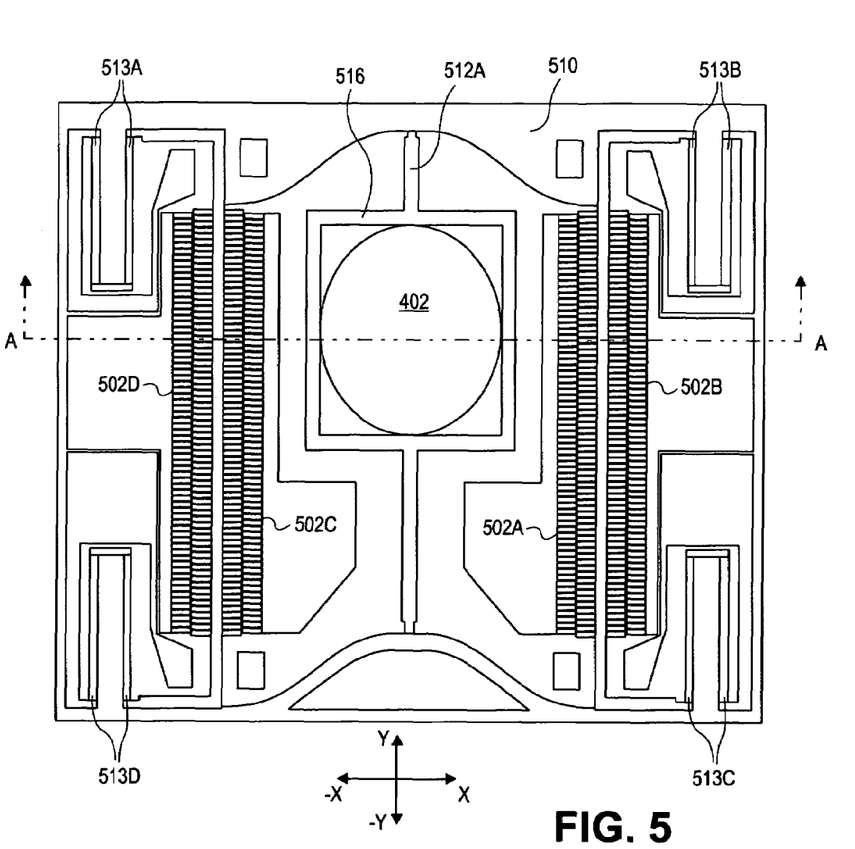
FIG. 5 is a plan view of an embodiment of an optical MEMS layer of the present invention.
Figure 6:
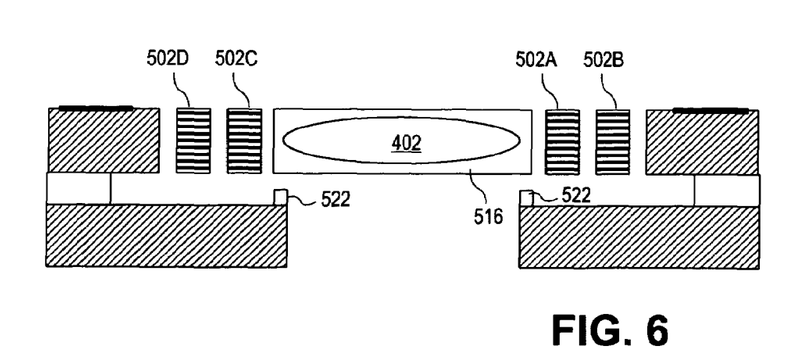
FIG. 6 is a cross-section of the embodiment of the optical MEMS layer of FIG. 5.

FIGS. 5 and 6 illustrate the details of an embodiment of the optical MEMS layer 206 comprising an MEMS microstage. FIG. 5 illustrates a top view of an embodiment of the MEMS microstage arrangement adapted to provide 2 degrees of mobility, referred to herein as the X/−X and Y/−Y directions. In the illustrated embodiment both degrees of mobility are translations, but in other embodiments the degrees of mobility may include translations, rotations, or both. As illustrated optical MEMS layer 206 includes various elements formed on a substrate 510. Substrate 510 may be formed of a wide range of substrate materials, including but are not limited to, silicon, silicon-on-insulator, and so forth. Stage 516 may be formed of a wide range of materials, including but are not limited to ceramic materials or semiconductor materials like silicon.

The elements formed on substrate 510 include moveable optical element 402 and a drive arrangement including micro drives 502a-502d, coupled to each other as shown. As described in more detail below, micro drives 502a-502d are adapted to selectively cooperate with one another to provide moveable optical element 402 with two degrees of mobility: a first degree of mobility along the X/−X direction, and a second degree of mobility along the Y/−Y direction. In particular, pairs of the micro drives 502a-502d—for example, micro drives 502b-502c, micro drives 502a-502d, micro drives 502a-502c or micro drives 502a-502d—may be complementarily activated to provide the two degrees of mobility, e.g., X with Y/−Y, −X with Y/−Y, Y with X/−X, or −Y with X/−X.

Optical MEMS layer 206 further includes stage 516, on which moveable optical element 402 is disposed. Moveable optical element 402 may be integrally formed on stage 516, or attached to stage 516. Optical element 402 may be any micro object where at least 1 degrees of mobility are desired (translation or rotation). Examples of optical element 402 include, but are not limited to, lenses, mirrors, diffractive elements, and so forth. For the embodiment, optical MEMS layer 206 is designed to have optical element 402 positioned substantially at the center of substrate 510, when it is not moved for any amount of distance in either the X/−X or Y/−Y directions. For ease of understanding, this position will be referred to as the "initial" position. In alternate embodiments, the "initial" position may be off-centered.

Optical MEMS layer 206 also includes compliant suspension beams 512a-512b, to which stage 516 (and therefore, moveable optical element 402) is attached. For the embodiment, compliant suspension beams 512a-512b are substantially elongated as well as curved in shape. Further, micro drives 502c and 502d are coupled to one end of compliant suspension beams 512a-512b, while micro drives 502c and 502d are coupled to the other end of compliant suspension beams 512a-512b. As described earlier, optical element 402 is attached to compliant suspension beam 512a-512b, which may comprise one or more layers of e.g. one or more metals or their alloys with compliant properties. Such metals include, but are not limited to, copper (CU), titanium (Ti), nickel (Ni), Gold (Au), silver (Ag), tantalum (Ta), molybdenum (Mo), chromium (Cr), cobalt (Co), Silicon (Si) and so forth. Resultantly, compliant suspension beams 512a-512b may be compressed to provide optical element 402 with mobility for a distance along the +Y direction, or extended (stretched) to provide optical element 402 with mobility for a distance along the −Y direction.

Micro drives 502b and 502c are adapted to be activated complementarily to move compliant suspension beams 512a-512b, and therefore moveable optical element 402, a distance along the X direction in a coordinated manner. Similarly, micro drives 502a and 502d are adapted to be activated complementarily to move compliant suspension beams 512a-512b, and therefore moveable optical element 402, a distance along the −X direction. Similarly, micro drives 502a and 502c are adapted to be activated complementarily to compress compliant suspension beams 512a-512b, to move moveable optical element 402 a distance along the Y direction, whilst micro drives 502b and 502d are adapted to be activated complementarily to extend compliant suspension beams 512a-512b, to move moveable optical element 402 a distance along the −Y direction.

In one embodiment, each of micro drives 502a-502d is a comb drive including at least two portions, at least one of which is adapted to be linearly moveable towards the other. In various embodiments, the other portion is fixed to substrate 510 through corresponding springs 513a-513d. Further, in various embodiments, the moveable portion is linearly moved towards the fixed portion electrostatically, that is when the drive is electrically energized. The amount of movement is a function of the intensity a micro drive is electrically energized. Accordingly, it is possible to achieve movements in two directions, by complementarily activating two cooperating micro drives with different intensities. In various embodiments, each of micro drives 502a-502d maybe independently activated with the same or different intensities. Note that a desired difference in intensities may be effectuated by activating a pair of micro drives with different intensities having the difference, including activating one of the two micro drive with an intensity equals to the difference, and "activating" the other micro drive with zero intensity. Accordingly, the term "complementary activation" as used herein, including the claims, include the "zero" form of "activation," with one of the micro drives "activate" with a zero intensity.

In various embodiments, optical MEMS layer 206 may further include a number of springs 513a-513d to which micro drives 502a-502d are coupled. Springs 513a-513d may be attached to substrate 510. For the embodiment, springs 513a-513d are also substantially elongated in shape, disposed substantially in parallel with micro drives 502a-502d. Springs 513a-513d may be formed with one or more layers of metals or alloys with compliant properties, including but not limited to the metals earlier enumerated for the compliant beams.

FIG. 6 further illustrates a cross-sectional view of the embodiment of the optical MEMS layer 206. As shown in this figure, optical MEMS layer 206 may be further provided with electrodes 522 under stage 516. Electrodes 522 are adapted to electrostatically attract stage 516, thereby providing a holding or locking function for holding or locking stage 516, and therefore optical element 402 in place, after stage 516 and optical element 402 have been moved to a desired operational location. In particular, the holding and locking operation may be performed post assembly or after substantial completion of assembly of the opto-electronic package 104. In other embodiments, in addition to or instead of electrodes 522, one or more regions of substrate may be energized to attract stage 516, thereby holding or locking stage 516, and therefore optical element 402, in place after they have been moved to a desired operational location/position. In still other embodiments, the holding or lock down function may be effectuated employing other physical principles, including but are not limited to electromagnetic, piezoelectrical bimorph, thermal bimorph, and the like.

The holding or locking in-place feature is particularly useful in conjunction with the moveable optical element 402, for holding or locking the optical element in place after it has been moved into a desired operational location, e.g., a location where it is in alignment with a light source and an optical fiber. As described earlier, this operation may be performed post assembly or after substantial completion of opto-electronic assembly 104. Further, at a later point in time after operated for a while, the holding or locking may be undone, to render the moveable optical element 402 to be moveable again to facilitate re-alignment of the elements. The moveable optical element 402 may be re-locked again after the re-alignment. The unlocking and realignment may be desired because of a change in operational requirement or because the elements became misaligned during operation. The unlocking, re-alignment, and re-locking process may be repeated any number of times as needed.

Figure 7:
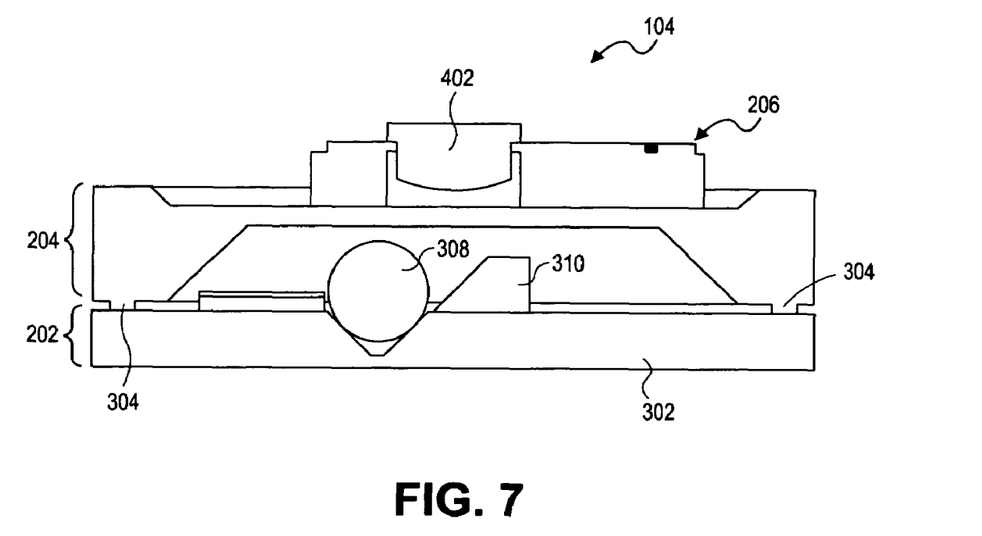
FIG. 7 is a cross-sectional view of an embodiment of the opto-electronic package in its assembled state.

FIG. 7 illustrates the embodiment of the opto-electronic package 104 in its assembled form. The photonic elements, including the laser 306, the optical element 308 and the turning mirror 310, are positioned on the base layer 202. The spacing layer 204 surrounds the photonic elements is positioned on the base layer 202 in contact with the seal ring 304, such that a hermetic seal is created. The optical MEMS layer 206 is positioned on the spacing layer 204 such that it is suspended above the photonic elements. The hermetic seal formed between the spacing layer 204 and the seal ring 304 results all the photonic elements being hermetically sealed within the package 104.

Figure 8:
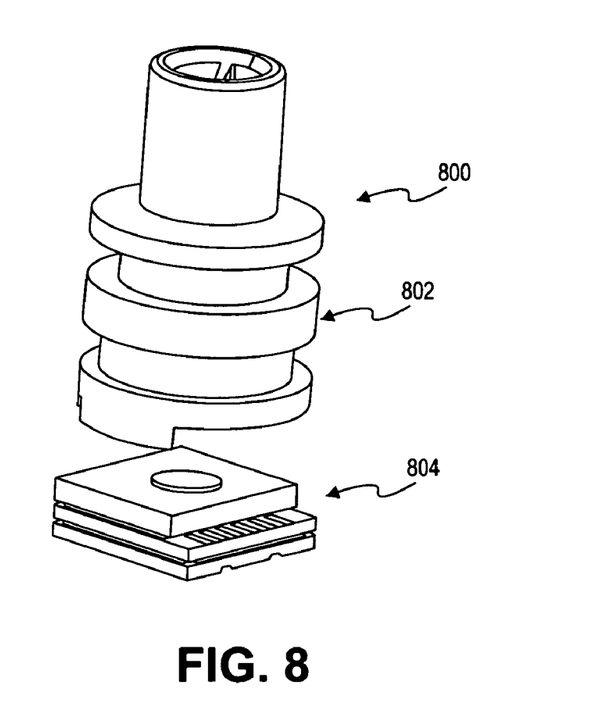
FIG. 8 is a perspective view of an embodiment of an assembly including an alternative embodiment of an opto-electronic package of the present invention.

FIG. 8 illustrates an alternative embodiment of an opto-electronic assembly 800. The optical assembly 800 includes an embodiment of a multi-layer opto-electronic package 804 that includes microelectromechanical (MEMS) components and also includes a thermoelectric cooler (TEC) that can be used to control the temperature of photonic elements within the package 804. To allow the opto-electronic package 804 to communicate with other optical components, the optical assembly 800 includes a receptacle 802 that can be attached to the opto-electronic package 804. The receptacle 802 provides a way to attach an optical fiber (not shown) to photonic components within the package 804 using an optical fiber connector (also not shown) that can be attached to the receptacle 802, thus putting the photonic components in optical communication with other devices. The opto-electronic package 804 can be either a transmitter or a receiver, and can therefore transmit signals to or receive signals from other optical components.

Figure 9:
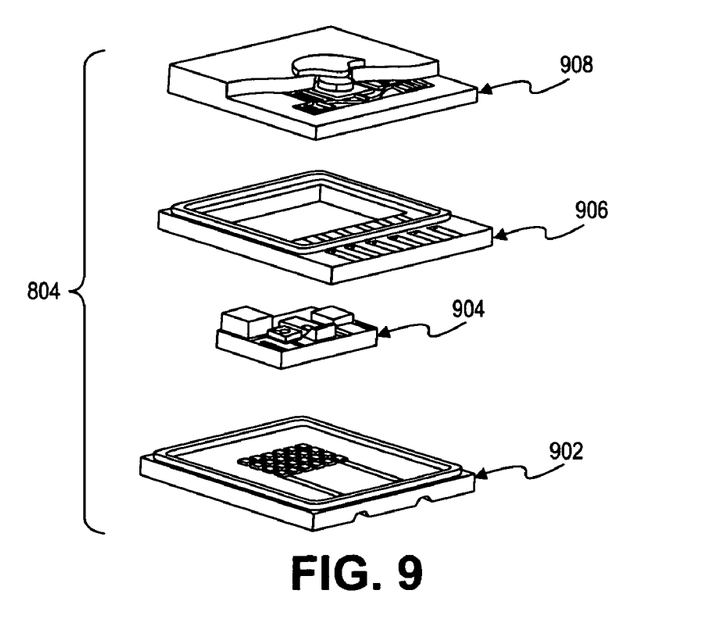
FIG. 9 is an exploded perspective view of the alternative embodiment of the opto-electronic package shown in FIG. 8.

FIG. 9 illustrates an embodiment of the components of the opto-electronic package 804. The opto-electronic package 804 comprises a multi-layer stack including a base layer 902, a photonic layer 904, a spacing layer 904, and an optical layer 906. The base layer 902 supports the entire package 804 and provides paths through which electrical signals and power can be delivered to photonic and other elements within the package. In addition, the base layer 902 provides a heat transfer path for heat generated within the package to escape.

In the embodiment shown, the photonic layer 904 is formed on the base layer 902 and includes various photonic elements thereon. The photonic layer 904 supports the various photonic and electronic elements that are placed thereon, provides electrical connections in addition to or instead of those found on the base layer, and can be used in conjunction with the base layer to form a thermoelectric cooler (TEC) so that the temperature of the photonic and electronic elements can be controlled.

The spacing layer 906 is formed on the base layer 902. The spacing layer surrounds the base layer and provides thermal isolation between the base layer and the rest of the package. In addition, the spacing layer sets a specific and known distance between the photonic components on the photonic layer 904 and the vertex of an optical element such as a lens found in the optical MEMS layer 908, and also ensures an electrical connection between the inside and the outside of the package through the hermetic seal of the package.

The final element in this embodiment of the package 804 is an optical MEMS layer 908 positioned over the spacing layer 906 and the photonic layer 904. In some embodiments the optical MEMS layer 908 can be placed within the hermetically sealed portion of the package 804, but in other embodiments the optical MEMS layer can be placed outside the hermetically sealed portion. The optical MEMS layer 908 is similar in construction to the optical MEMS layer 206 described above in connection with FIG. 2, so details of the construction of optical MEMS layer 908 are therefore not discussed further. Details of embodiments of the base layer 902, photonic layer 904 and spacing layer 906 are discussed below in connection with FIGS. 10-16.

Figure 10:
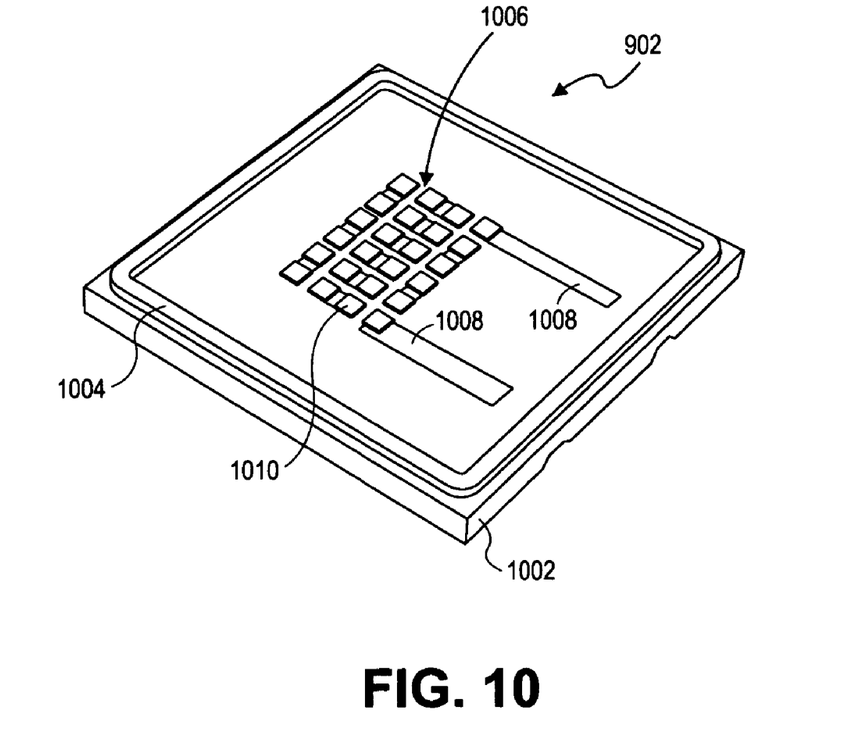
FIG. 10 is a perspective view of an alternative embodiment of a base layer usable with the alternative embodiment of an opto-electronic package shown in FIG. 8.
Figure 11:
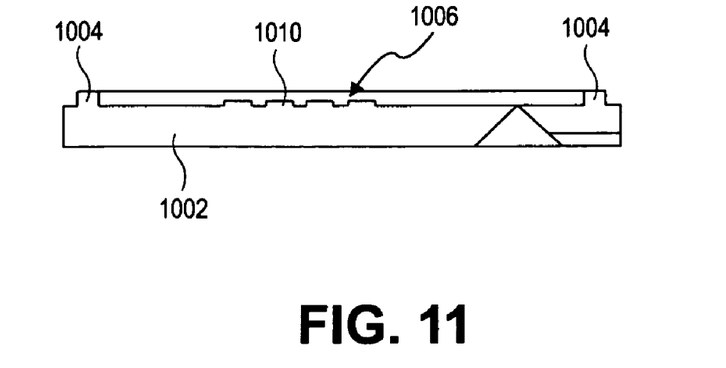
FIG. 11 is a cross-sectional view of the alternative embodiment of a base layer shown in FIG. 10.

FIGS. 10 and 11 illustrate the details of an embodiment of the base layer 902. The base layer 902 is generally rectangular in shape and is formed on a substrate 1002. In one embodiment the substrate 1002 is made of silicon, although in other embodiments other materials or other combinations of materials can be used. An area 1006 on the substrate 1002 is designated to receive the photonic layer 904 when the photonic layer is placed on the base layer. Prior to placement of the photonic layer in the area 1006, a thin film thermoelectric material 1010 is deposited or pre-formed on the surface of the substrate 1002 within the area 1006. In one embodiment, the thin film thermoelectric material is applied by sputtering, although in other embodiments different processes such as chemical or physical vapor deposition can be used. When the photonic layer 904 is later placed on the area 1006, the thin film thermoelectric material 1010 is sandwiched between the base layer 902 and the photonic layer 904, forming a micro thermoelectric (TEC) cooler. The TEC formed between the base layer 902 and the photonic layer 904 enhances heat transfer to the base layer and is useful in some embodiments to control the temperature of the photonic layer and the components on the photonic layer. For example, if the photonic layer 904 includes a laser whose output wavelength is sensitive to temperature, the TEC allows excellent control of the laser's temperature and can be used to ensure that the output of the laser is maintained at the desired wavelength. In other embodiments of the opto-electronic package 804 where the ability to control temperature is not needed, the TEC can be omitted by omitting the thin-film thermoelectric material 1010. In still other embodiments where cooling is not needed the photonic layer can be omitted and the photonic components can be placed directly on the base layer, thus essentially merging the photonic layer into the base layer.

One or more electrical traces 1008 are formed on the surface of the substrate 1002, leading from near the area 1006 to near the perimeter of the substrate 1002. In one embodiment, the electrical traces can be formed of metal using standard metallization techniques, although different techniques are of course possible, for example where the electrical traces are made using conductive non-metals. The electrical traces 1008 may reside on the surface of the substrate 1002, or may extend into the interior of the substrate, for example in metal-filled vias. Electrical traces 1008 can later be used to provide power to the TEC formed in area 1006 (if present), as well as power, electrical signals, and so forth to optical or electronic components on the photonic layer 904.

A seal ring 1004 is formed at or near the perimeter of the substrate 1002. The seal ring 1004 surrounds the area 1006 and most of the electrical traces 1008. The purpose of the seal ring 1004 is to allow for control of the spacing between the base layer 902 and the spacing layer 906, as well as to allow the base layer to form a hermetic seal with the spacing layer 906 when the spacing layer is later placed on the base layer. In one embodiment, the seal ring 1004 may be formed of silicon, although in other embodiments the seal ring 1004 may be formed of different variations of silicon materials, materials other than silicon, or combinations of silicon and non-silicon materials.

Figure 12:
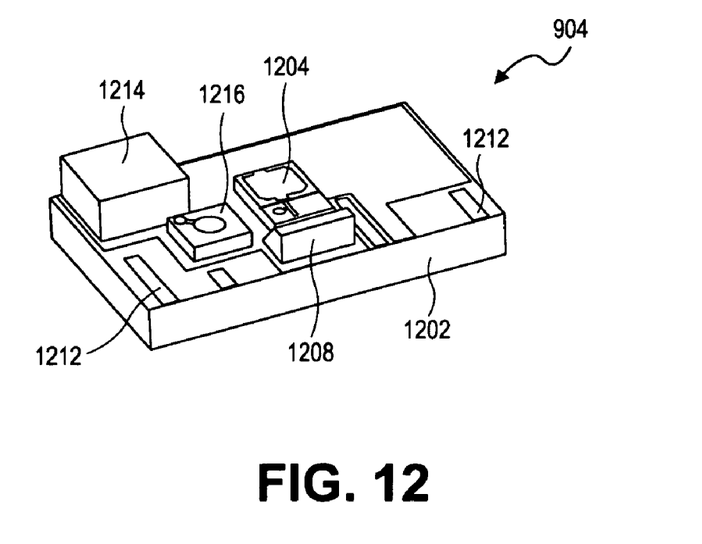
FIG. 12 is a perspective view of an embodiment of a photonic layer usable with the alternative embodiment of an opto-electronic package shown in FIG. 8.
Figure 13:
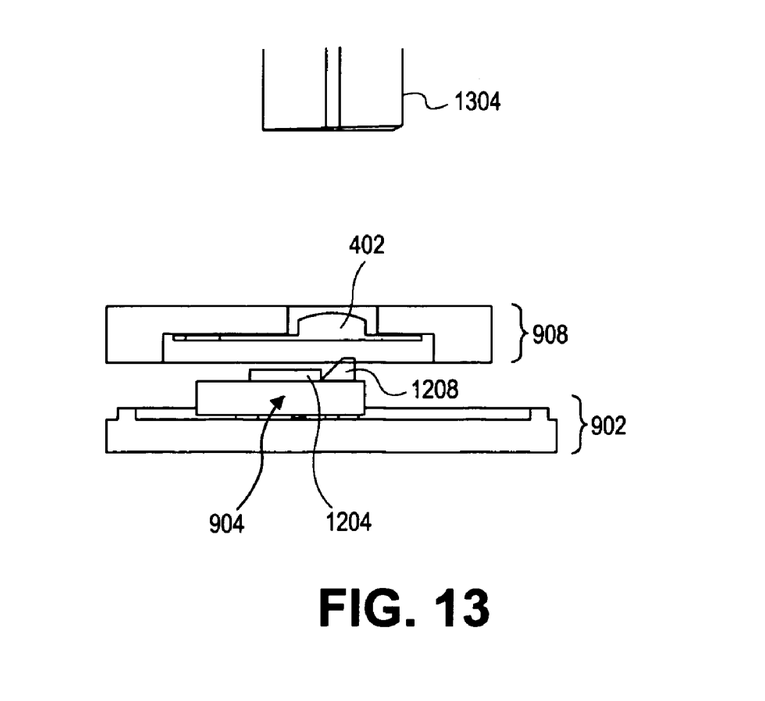
FIG. 13 is a cross-sectional view of the alternative embodiment of the opto-electronic package shown in FIG. 8.

FIGS. 12 and 13 together illustrate the details of an embodiment of the photonic layer 904. The photonic layer 904 includes a substrate 1202, which in the embodiment shown is made of silicon but in other embodiments can be made of other materials. Various photonic and electronic elements can be formed or placed on the photonic layer 904. In the embodiment shown, a edge emitting laser diode 1204 is formed on the substrate 1202 and various other active or passive optical elements, such as turning mirror 1208, are formed on the substrate to condition and direct a laser beam emanating from the laser diode 1204. One or more wire-bonding pads 1212 are formed on the base layer to provide attachment points for wires to provide electrical power, electrical signals, or both, as the case may be, to the electronic and photonic components on the base layer. Electrical traces (not shown) lead from the wire bonding pads to the relevant components. Additional electronic or photonic components 1214 and 1216, such as resistors, capacitors, inductors, voltage regulators, etc, can also be formed on the photonic layer 904 and connected to the proper components thereon.

FIG. 13 illustrates the construction and operation of the embodiment of the photonic layer 904. In the embodiment shown, the laser diode 1204 emits a laser beam in the direction of the turning mirror 1208, which turns the laser beam through about 90°, thus turning the laser beam out of the plane of the photonic layer 904. In other embodiments it is of course possible to use the turning mirror to turn the beam through an angle other than about 90°. When the optical MEMS layer 908 (described above in connection with FIGS. 5 and 6) is in place, the laser beam reflected from the turning mirror 1208 is focused by the moveable optical element 402 such that it is launched into the end of an optical fiber 1304. Since the moveable optical element 402 in the optical MEMS layer 908 is moveable, it can me moved around to optimize the optical coupling between the laser diode 1204 and the optical fiber 1304 when the optical fiber is connected to the package 804 through the receptacle 802, as shown in FIG. 8. Although not shown in the drawing, in other embodiments additional optical elements, such as a lens, can be used to condition (e.g., collimate or focus) the laser beam as it exits the laser and/or after it is reflected from the turning mirror 1208. The illustrated embodiment is only one possible combination of photonic elements that can be used; in other embodiments, more, less or different photonic elements. For example, in a different embodiment the laser diode can be replaced with an edge-emitting laser or a light emitting diode (LED). In other embodiments, the edge-emitting laser can be replaced with a vertical surface emitting laser (e.g., a VCSEL), in which case elements such as the turning mirror 310 can be omitted.

The operation of the photonic layer 904 described above is characteristic of a transmitter, but a receiver embodiment of the base layer can also be constructed. In a receiver embodiment, the laser diode 1204 is replaced with a photodetector and the direction of the signal is reversed, such that a signal traveling through the fiber 1304 is emitted from the fiber end and collimated by the moveable optical element 402. The collimated signal is then turned 90°, directed toward turning mirror 1208, and directed toward the photodetector. As with the transmitter embodiment, since the optical element 402 is moveable, it can be moved around to optimize the optical coupling between the optical fiber 1304 and the photodetector 1204 and when the optical fiber is connected to the package 804 through the receptacle 802, as shown in FIG. 8. Although not shown in the drawing, in other embodiments additional optical elements, such as a lens, can be used to condition (e.g., collimate or focus) the laser beam before and/or after it is reflected from the turning mirror 1208.

Figure 14:
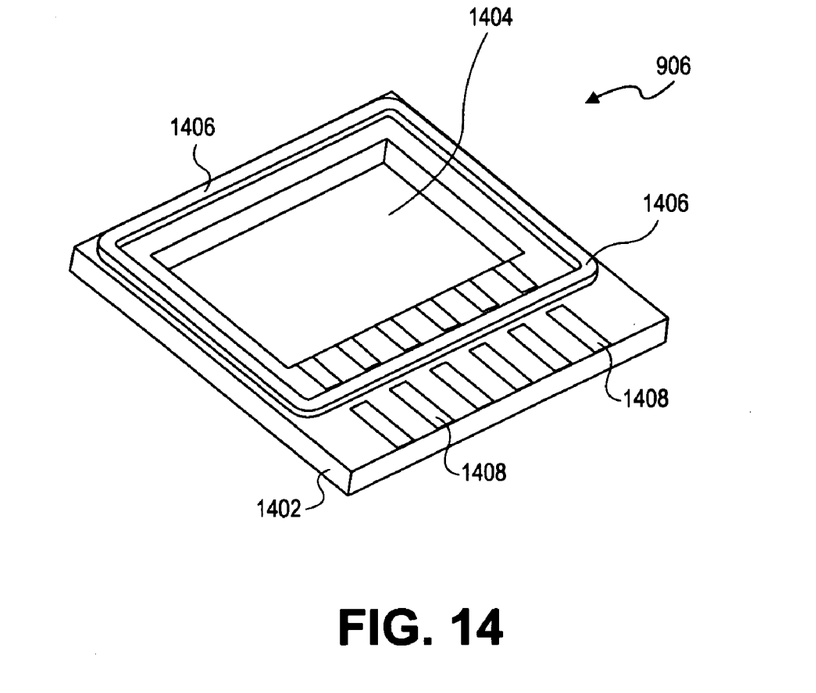
FIG. 14 is a perspective view of an alternative embodiment of a spacing layer usable with the alternative embodiment of an opto-electronic package shown in FIG. 8.
Figure 15:
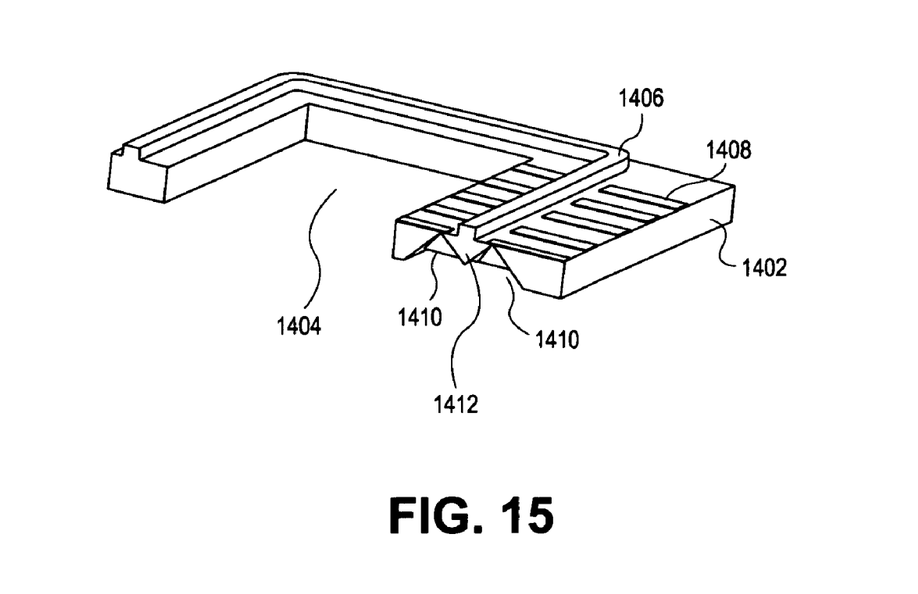
FIG. 15 is a perspective cross-section of the alternative embodiment of a spacing layer shown in FIG. 14.

FIGS. 14 and 15 illustrate the details of an embodiment of the spacing layer 906. FIG. 14 shows that the spacing layer 906 includes a substrate 1402, which in the embodiment shown is made of silicon but in other embodiments can be made of other materials. In one embodiment, the thickness of the substrate 1402 is of the same order of magnitude as the thickness of the substrate 1202 of the photonic layer 904, but in other embodiments the thickness of substrate 1402 can be greater that, less than, or the same as the overall thickness of the photonic layer 904.

An opening 1404 in the substrate is designed to accommodate and surround the base layer, meaning that the length and width of the opening 1404 are selected to be greater than or equal to the length and width of the photonic layer 904. A seal ring 1406 is formed to surround the opening 1404. In one embodiment, the seal ring 1406 may be formed of silicon, although in other embodiments the seal ring 1406 may be formed of different variations of silicon materials, materials other than silicon, or combinations of various materials. The seal ring 1406 allows the optical MEMS layer 908 to form a hermetic seal with the spacing layer 906 when that layer is later formed on the base layer. With the seal ring 1004 forming a hermetic seal between the base layer 902 and the spacing layer 906, and the seal ring 1406 forming a hermetic seal between the spacing layer 906 and the optical MEMS layer 908, the base layer becomes hermetically sealed from the exterior, thus protecting the photonic elements on the photonic layer 904 from contamination, moisture, and so on.

FIG. 15 illustrates the construction of the spacing layer 906, in particular the positioning and routing of a plurality of electrical traces 1408. The electrical traces 1408 extend from an edge of the opening 1404 to the edge of the substrate 1408. To ensure that the seal ring 1406 can form a hermetic seal with the optical layer, the electrical traces 1408 extend approximately from the edge of the opening 1404 to the inner edge of the seal ring 1406. Before the traces 1408 reach the seal ring, they are routed through the substrate into a pair of notches 1410 in the bottom of the substrate 1402. The shape of the notches 1410 results in a substantially V-shaped (or cylindrical) protrusion 1412. The traces are formed along the surfaces of the protrusion 1412, and re-emerge to the top of the substrate 1402 on the outer side of the seal ring 1406. The electrical traces 1408 then extend continuously from outside the seal ring 1406 approximately to the edges of the substrate 1402, while ensuring that the seal ring 1406 can maintain a hermetic seal. The electrical traces can be formed using standard metallization processes. The electrical traces are used to provide electrical power or signals to the elements on the base layer, as well as to provide electrical power to the optical MEMS layer 908 which will be formed on the spacing layer 908. In one embodiment, wire bonding can be used to connect each trace to corresponding wire bonding pads 1212 on the base layer.

Figure 16:
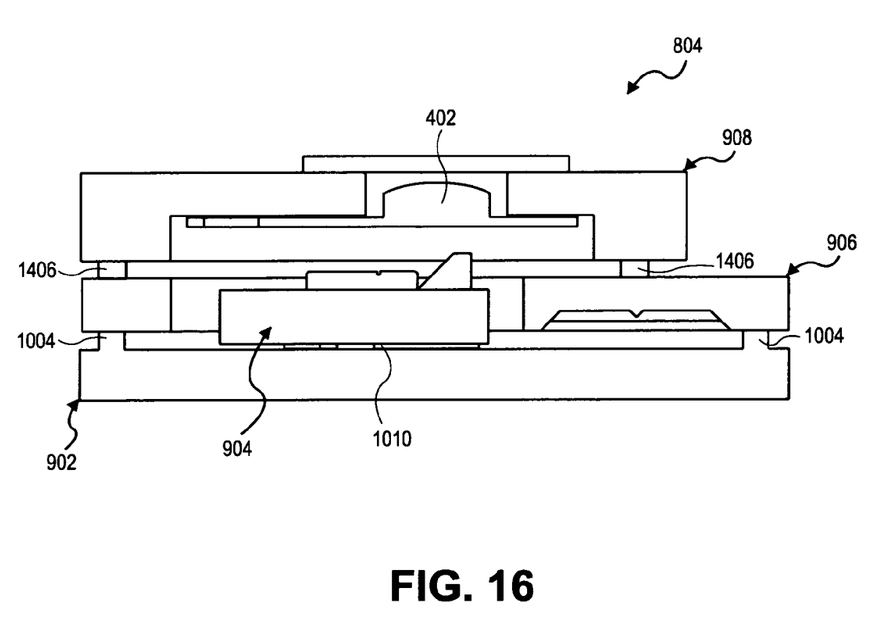
FIG. 16 is a cross-sectional view of the alternative embodiment of the opto-electronic package of FIG. 8 in its assembled state.

FIG. 16 illustrates the embodiment of the opto-electronic package 804 in its assembled form. The photonic layer 904 is positioned on the base layer 902, with the layer of thermoelectric material 1010 sandwiched between the photonic and base layers. The spacing layer 906 surrounds the photonic layer 904 and is positioned on the base layer in contact with the seal ring 1004, such that a hermetic seal is created. The optical MEMS layer 908 is then positioned on the spacing layer, such that the moveable optical element 402 is above the photonic elements. The optical MEMS layer 908 rests on the seal ring 1406 that surrounds the opening in the spacing layer, and creates a hermetic seal. The hermetic seal formed between the spacing layer and the seal ring 1004 and the hermetic seal formed between the optical MEMS layer 908 and the seal ring 1406 result in the photonic layer, and hence all the photonic elements thereon, being hermetically sealed within the package 804.

Figure 17:
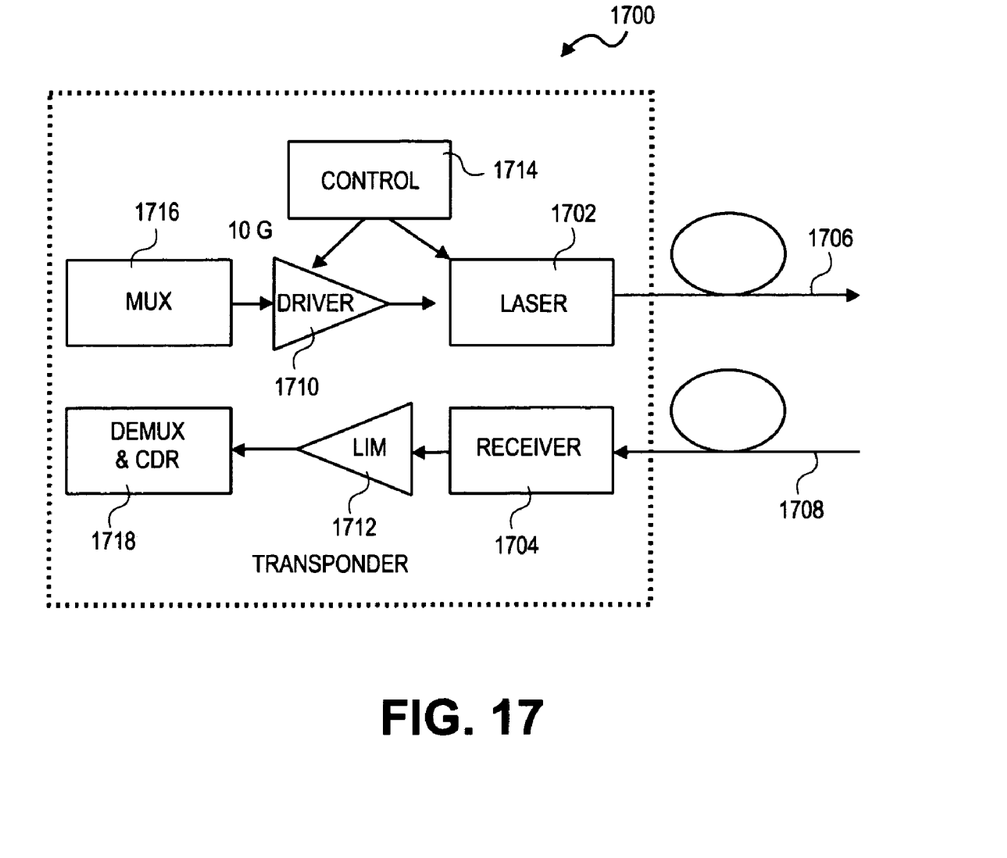
FIG. 17 illustrates an embodiment of a system incorporating an embodiment of the present opto-electronic package.

FIG. 17 schematically illustrates an embodiment of a system 1700 incorporating the present invention. The system 1700 is a transponder that can both transmit and receive optical signals via optical fiber. The transmission portion of the transponder 1700 includes a laser 1702 coupled to some other optical component by an optical fiber 1706. The laser is coupled to a driver 1710, and both the laser 1702 and the driver 1710 are coupled to a controller 1714. A multiplexer 1716 is coupled to the driver, and one or more signal sources (not shown) are coupled to the multiplexer 1716. The receiving portion of the transponder 1700 includes a receiver 1704 coupled to an optical signal source by an optical fiber 1708. The receiver 1704 is coupled to a LIM unit 1712, and the LIM unit is in turn coupled to a de-multiplexer 1718. In the transponder 1700, the laser 1702, the receiver 1704, or both, can be opto-electronic packages such as packages 104 and 804 described above. Other embodiments of the system can include more, less or different components. In another embodiment, for example, one or both of the mutliplexer and de-multiplexer can be omitted, depending on the transponder interface standard.

In operation, the multiplexer 1716 receives one or more electrical signals from one or more signal sources (not shown). The multiplexer multiplexes the multiple signals it receives and sends a multiplexed signal to the driver 1710. Under the control of the controller 1714, the driver 1710 and the laser 1702 modulate the multiplexed signal onto an optical carrier, and the multiplexed optical signal is then launched into the optical fiber 1706. On the receive side, the receiver 1704 receives an optical signal from the fiber 1708. The receiver 1704 and LIM unit 1712 perform an opto-electronic conversion and convert the optical signal into an electrical signal. The electrical signal is then fed into the de-multiplexer for separation into de-multiplexed components signals. Each component signal is then transmitted to its destination.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An opto-electronic apparatus comprising:
   a base layer;
   one or more photonic elements positioned on the base layer; and
   an optical layer suspended over the base layer, the optical layer including a moveable optical element with at least two translational degrees of freedom in a plane substantially parallel to the base layer, wherein the moveable optical element is optically coupled to at least one of the one or more photonic elements.

2. The apparatus of claim 1 wherein the base layer includes a seal ring surrounding the one or more photonic elements.

3. The apparatus of claim 2, further comprising a spacing layer in contact with the seal ring that forms a hermetic seal around the one or more photonic elements.

4. The apparatus of claim 1 wherein the optical layer is a MEMS microstage having the moveable optical element mounted therein.

5. The apparatus of claim 1, further comprising a spacing layer between the base layer and the optical layer, wherein the spacing layer suspends the optical layer over the base layer.

6. The apparatus of claim 5 wherein the base layer includes a seal ring surrounding the photonic elements.

7. The apparatus of claim 6 wherein the spacing layer is in contact with the seal ring of the base layer and the optical layer is mounted on the spacing layer, such that a hermetic seal is formed around the one or more photonic elements.

8. The apparatus of claim 7 wherein the optical layer is mounted on the inside of the spacing layer, such that it is within the hermetic seal.

9. The apparatus of claim 1, further comprising a receptacle having a fiber stub or fiber pigtail therein, wherein the receptacle attaches to the optical layer such that the fiber stub is substantially aligned with the optical element.

10. An opto-electronic apparatus comprising:
    a base layer;
    a photonic layer placed on the base layer and including one or more photonic elements thereon;
    a thermoelectric material sandwiched between the base layer and the photonic layer;
    a spacing layer placed on the base layer, the spacing layer including an opening that surrounds the photonic layer; and
    an optical layer suspended over the base layer, the optical layer including a moveable optical element with at least two translational degrees of freedom in a plane substantially parallel to the base layer, wherein the moveable optical element is optically coupled to at least one of the one or more photonic elements.

11. The apparatus of claim 10 wherein the base layer includes a seal ring surrounding the base layer.

12. The apparatus of claim 11 wherein the spacing layer includes a seal ring surrounding the opening.

13. The apparatus of claim 12 wherein the spacing layer is in contact with the seal ring of the base layer and the optical layer is in contact with the seal ring of the spacing layer, forming a hermetic seal around the base layer.

14. The apparatus of claim 10 wherein the optical layer is attached to the photonic layer, and wherein the spacing layer surrounds and hermetically seals the photonic layer and the optical layer.

15. The apparatus of claim 10 wherein the optical layer is a MEMS microstage having the moveable optical element mounted therein.

16. A process comprising:
    forming a base layer;
    placing one or more photonic elements on the base layer; and
    suspending an optical layer over the photonic elements on the base layer, the optical layer including a moveable optical element with at least two translational degrees of freedom in a plane substantially parallel to the base layer, wherein the moveable optical element is optically coupled to at least one of the one or more photonic elements.

17. The process of claim 16 wherein the optical layer is a MEMS microstage having the optical element mounted therein.

18. The process of claim 16, further comprising forming a spacing layer between the base layer and the optical layer, wherein the spacing layer suspends the optical layer above the base layer.

19. A process comprising:
    forming a base layer;

placing one or more photonic elements on a photonic layer;

sandwiching a thermoelectric material between the base layer and the photonic layer;

forming a spacing layer on the base layer, the spacing layer surrounding the photonic layer; and placing an optical layer on the spacing layer, the optical layer including a moveable optical element with at least two translational degrees of freedom in a plane substantially parallel to the base layer, wherein the moveable optical element is optically coupled to at least one of the one or more photonic elements.

20. The process of claim 19 wherein the optical layer includes a MEMS microstage having the optical element mounted therein.

21. The apparatus of claim 19, further comprising positioning the spacing layer in contact with a seal ring on the base layer and positioning the optical layer in contact with a seal ring on the spacing layer, forming a hermetic seal around the photonic layer.

22. A process comprising:

attaching an optical fiber to an opto-electronic package comprising:

a base layer, one or more photonic elements placed on the base, and an optical layer positioned over the base layer, the optical layer including a moveable optical element with at least two translational degrees of freedom in a plane substantially parallel to the base layer, wherein the moveable optical element is optically coupled to at least one of the one or more photonic elements; and optimizing signal coupling between the one or more photonic elements and the optical fiber by adjusting the position of the moveable optical element.

23. The process of claim 22 wherein the optical layer comprises a MEMS microstage.

24. The process of claim 23 wherein adjusting the position of the moveable optical element comprises applying electric current to one or more drives within the microstage.

25. The process of claim 22 wherein the opto-electronic package includes a thermoelectric cooler, and further comprising controlling the temperature of the photonic elements using the thermoelectric cooler.

26. A system comprising:

at least one electrical signal source;

a multiplexer connected to the at least one signal source;

an opto-electronic package coupled to the multiplexer, the opto-electronic package comprising:

a base layer, one or more photonic elements mounted on the base layer, and an optical layer placed on the base layer, the optical layer including a moveable optical element with at least two translational degrees of freedom in a plane substantially parallel to the base layer, wherein the moveable optical element is optically coupled to at least one of the one or more photonic elements; and a receptacle attached to the opto-electronic package such that an optical fiber can be connected to the opto-electronic package and optically coupled with the one or more photonic elements element.

27. The apparatus of claim 26 wherein the optical layer is a MEMS microstage having the optical element mounted therein.

28. The apparatus of claim 26, further comprising a spacing layer between the base layer and the optical layer.

* * * * *